United States Patent [19]
Bonk et al.

[11] Patent Number: 4,731,273
[45] Date of Patent: Mar. 15, 1988

[54] HEAT-RECOVERABLE CLOSURE WITH CROSSLINKED PRESSURE-SENSITIVE ADHESIVE

[75] Inventors: Thomas J. Bonk, Stillwater; Tsung-I Chen, Woodbury; Patricia M. Olson; Douglas E. Weiss, both of Minneapolis, all of Minn.

[73] Assignee: Minnesota Mining and Manufacturing Company, St. Paul, Minn.

[21] Appl. No.: 752,946

[22] Filed: Jul. 8, 1985

[51] Int. Cl.4 .............................................. B32B 7/00
[52] U.S. Cl. ..................................... 428/57; 428/36; 428/355
[58] Field of Search ................... 428/35, 36, 343, 355, 428/57

[56] References Cited

U.S. PATENT DOCUMENTS

| | | | |
|---|---|---|---|
| 2,207,692 | 7/1940 | McPherson | 250/33 |
| 3,243,211 | 3/1966 | Wetmore | 287/78 |
| 3,297,819 | 1/1967 | Wetmore | 174/127 |
| 3,379,218 | 4/1968 | Conde | 138/99 |
| 3,415,287 | 12/1968 | Heslop et al. | 138/141 |
| 3,455,336 | 7/1969 | Ellis | 138/156 |
| 3,530,898 | 9/1970 | Wilson | 138/99 |
| 3,542,077 | 11/1970 | Muchmore | 138/99 |
| 3,770,556 | 11/1973 | Evans et al. | 161/39 |
| 3,847,721 | 12/1974 | Evans | 161/108 |
| 3,959,052 | 5/1976 | Stanek | 156/86 |
| 4,153,747 | 5/1979 | Young et al. | 428/40 |
| 4,181,752 | 1/1980 | Martens et al. | 427/54.1 |
| 4,200,676 | 4/1980 | Caponigro et al. | 428/57 |
| 4,268,559 | 5/1981 | Smuckler | 428/99 |
| 4,404,246 | 9/1983 | Charbonneau et al. | 428/212 |
| 4,472,468 | 9/1984 | Tailor et al. | 428/349 |
| 4,533,419 | 8/1985 | Pieslak et al. | 156/85 |

*Primary Examiner*—Edith Buffalow
*Attorney, Agent, or Firm*—Donald M. Sell; James A. Smith; Gerald F. Chernivec

[57] ABSTRACT

A heat-recoverable closure with a crosslinked pressure-sensitive adhesive is provided. The closure member is comprised of a heat-recoverable sheet and a layer of crosslinked pressure-sensitive adhesive, which maintains the closure of the closure member having the recovery process. The combination of a high surface energy heat-recoverable sheet and the crosslinked pressure-sensitive adhesive yield an article having excellent performance as a closure member.

17 Claims, 4 Drawing Figures

HEAT-RECOVERABLE CLOSURE WITH CROSSLINKED PRESSURE-SENSITIVE ADHESIVE

TECHNICAL FIELD

This invention relates to a heat-recoverable polymeric sheet which utilizes a crosslinked pressure-sensitive adhesive system to effect a high strength closure. The sheet is used as a wrap-around protective closure.

BACKGROUND ART

Heat-recoverable polymeric articles are well known in the art. Such articles have found utility in the repair or protection of tubular conduits such as pipe or cable, and to seal generally cylindrical substrates such as cable splices, electrical connectors and the like. A number of patents have been issued dealing with this utility, examples of which include U.S. Pat. Nos. 2,207,692; 3,243,211; 3,297,819; and 3,415,287.

In some instances, heat-recoverable tubing has been utilized for some applications. In this case, however, a free end of the substrate is required over which the tubing can be positioned. Recently, wrap around heat-recoverable sleeves have been described as closure members, as for example in U.S. Pat. Nos. 3,379,218; 3,455,336; and 3,530,898, which typically contain an open longitudinal seam to allow placement of the sleeve over the substrate and thus eliminate the necessity for cutting the substrate to obtain thereby a free end over which a tubing could be placed.

Such heat-recoverable sleeves or closure members typically consist of a rectangular sheet, such as is disclosed in U.S. Pat. No. 3,847,721, among others, or a longitudinally slit tubing as is disclosed in the earlier referenced patents, which comprises a heat-recoverable plastic material having the property of elastic memory, the material typically having been rendered heat-recoverable by stretching same at an elevated temperature, followed by cooling while in the stretched shape, together with a means for closing the open longitudinal seam during subsequent shrinking. Furthermore, it is typical to coat the interior surface of the heat-recoverable sleeve with a heat-activatable adhesive, e.g., a hot melt adhesive, or a flowable mastic composition to ensure intimate contact or binding of the sleeve with the substrate surface. In addition, this heat-activated adhesive or sealant also functions to hermetically seal the cable at the location of the repair.

Several methods for joining an open longitudinal seam of a heat-recoverable wrap around sleeve during installation have been described in the art, as disclosed in the above-referenced patents. Such closure devices must be capable of maintaining the seam against the substantial shrinkage forces present during heat recovery of the sleeve. Mechanical closures have been utilized, and include such means as metal slip-on channels, as disclosed in U.S. Pat. No. 3,455,336; buttons, as disclosed in U.S. Pat. No. 3,379,218; threaded loops, as disclosed in U.S. Pat. No. 3,530,898; and embedded inserts, as is disclosed in U.S. Pat. No. 3,542,077. The use of such mechanical means for closure exhibit several disadvantages, however, e.g., the necessity of elaborate extrusion or molding processes for sleeve fabrication; the bulkiness and awkwardness of such mechanical closures; thermal stresses which may be generated during the heat-recovery stage, etc.

Recognizing these deficiencies, adhesive techniques were developed to hopefully eliminate same. Such adhesive systems capable of exhibiting sufficient strength to withstand the recovery forces of the heat-recoverable sleeve during recovery along the longitudinal seam include cyanoacrylates as disclosed in U.S. Pat. No. 3,959,052; silicone adhesives, as disclosed in U.S. Pat. No. 4,153,747; chloroprene-based contact adhesives, as disclosed in U.S. Pat. No. 3,770,556, and crosslinked hot-melt adhesives as described in U.S. Pat. No. 4,220,676. In addition, closures utilizing a pressure sensitive adhesive have been disclosed, wherein the adhesive is placed to two fixed edges of the sleeve, i.e., the fixed edges not being heat recoverable. These are disclosed in U.S. Pat. Nos. 4,153,747 and 4,268,559.

It can thus be seen that in the aforementioned references utilizing a hot melt adhesive patch to maintain closure, same limits the cable diameter size with which the heat recoverable sleeve can be utilized, because a cool portion must be maintained along the axis of the closure to in essence act as a brake to prevent the forces of contraction from shearing the hot melt adhesive under the patch and thus opening the closure.

In the systems utilizing pressure-sensitive adhesives, same is typically applied to each of two unstretched or fixed edges. Again, the use of such fixed edges is a limiting factor relative to cable diameter size, i.e. a rather large inventory of such sleeves are required in order to be utilized over a wide range of substrate diameters.

We have now determined that a heat-recoverable closure member can be provided having a crosslinked adhesive applied thereto. Such a closure member or sleeve allows adjustment to fit a wide variety of substrate diameters by simply trimming along the opposite edge of the sleeve, that which contains no pressure-sensitive adhesive thereon, to basically match the circumference of the substrate. Alternatively, adjustment can be undertaken by continuously wrapping the sleeve about the substrate to provide a loose fit. Such a sleeve obviously does not require precise alignment of one longitudinal seam along another, and application of the sleeve to the underlying substrate can be easily undertaken in the field by unskilled personnel.

SUMMARY OF THE INVENTION

In accordance with the invention, there is provided a heat-recoverable closure member which comprises a sheet of heat-recoverable material comprised of a polymeric composition which is capable of exhibiting plastic memory and shrinking upon the application of heat thereto and a layer of a crosslinked pressure-sensitive adhesive wherein the adhesive layer is adhered to the sheet transverse to the direction of recovery of the sheet.

The placement of the adhesive transverse to the direction of recovery is to secure the sheet during recovery thereof.

The crosslinked pressure-sensitive adhesive is preferably comprised of:
 (a) an acrylate terpolymer comprised of:
  (i) at least one alkyl acrylate wherein the alkyl group has at least 5 carbon atoms,
  (ii) a second alkyl acrylate wherein the alkyl group has from 1 to 4 carbon atoms;
  (iii) at least one copolymerizable monoethylenic monomer selected from the group consisting of acrylic acid, methacrylic acid, and itaconic acid; and (b) a crosslinking agent selected from the group consisting of:
(i) an amine formaldehyde condensate,
(ii) a chromophore-substituted trihalomethyltriazine,
(iii) a polyfunctional acrylate monomer; and
(iv) mixtures thereof,
in an amount of from about 0.8% to about 10% by weight of the terpolymer.

This invention also relates to a reinforced heat-recoverable closure member comprising a sheet of heat-recoverable material having an opening therein spaced apart from every edge of the sheet and a crosslinked pressure-sensitive adhesive as described above surrounding the opening in an amount sufficient to prevent substantial deformation of the opening upon recovery of the heat-recoverable material. The adhesive of this invention acts as a grommet in this application to prevent deformation, e.g., elongation, splitting, etc., of an opening in the heat-recoverable material through which a second member, e.g., a bleed port, a supporting rod or cable, etc., may pass.

DETAILED DESCRIPTION OF THE INVENTION

Figure 1:
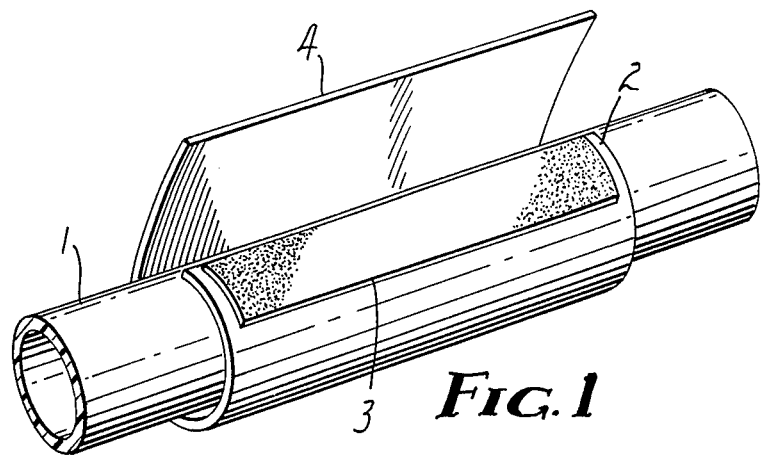
FIG. 1 is a view of a partially wrapped closure with an interposed adhesive layer.

Useful materials for the heat-recoverable sheet of this invention are typically comprised of a semicrystalline crosslinkable polymer, such as polyolefins (e.g., polyethylene), polyesters (e.g., polyethylene terephthalate), or polyamides (e.g., nylon), which has been stabilized against ultraviolet and oxidative degradation. Blends of a non-crystalline polymer (e.g. neoprene) with a semicrystalline polymer (e.g. polyethylene) are also useful as heat recoverable sheet materials. In the case of polyethylene and other polymers which are crosslinkable with radiation without significant degradation, electron beam crosslinking is highly desirable for web or tube processing and precision control of crosslinking chemistry. Radiation crosslinked materials generally contain a pro-rad (a multifunctional acrylate or allylic monomer) to enhance the dose/modulus response and a loading of carbon black for increased reinforcement and thermal conductivity. Chemically crosslinked polymers, e.g., silane, peroxide, etc. are also useful. Orientation of such materials typically follows the extrusion and crosslinking steps and must be performed at temperatures above the crystalline melt temperature of the composition. The orientation locks into place when the material is cooled in its stretched state. Generally stretch ratios of up to about 8 are possible to accommodate transitions in diameter with recovery forces ranging up to about 15 pounds per linear inch, which can be controlled by the extension ratio and the crosslink density.

The crosslinked pressure-sensitive adhesive useful as the closure adhesive in the heat recoverable sheet materials of this invention will be described in more detail below. Several adhesives useful in this invention are described in U.S. Application Ser. No. 752,950, filed concurrently herewith and incorporated herein by reference thereto.

The acrylate terpolymers useful in the crosslinked adhesives of the present invention are of the general type disclosed in U.S. Pat. No. 4,404,246. The preferred long chain alkyl acrylate ester of type (i) is isooctyl acrylate. The preferred short chain alkyl acrylate esters of type (ii) are ethyl and/or n-butyl acrylates. The preferred acidic monomer of type (iii) is acrylic acid.

The inclusion of the alkyl acrylate ester having from 1 to 4 carbon atoms in the alkyl group has been found to permit increased levels of the acid monomer, typically the hardening monomer because of the acid functionality, to be present without embrittlement of the composition upon crosslinking or total loss of tackiness thereof prior to crosslinking.

The relative amounts of monomers selected from each of the three types are selected to achieve the optimum adhesive properties for a given adhesive application. In general, the terpolymers are comprised of a major amount of the long chain alkyl acrylate of type (i), a minor amount of a short chain alkyl acrylate of type (ii), and an even more minor amount of the acidic monomer of type (iii). The preferred terpolymers are comprised of about 50 to about 60% by weight of the long chain alkyl acrylate, from about 32 to about 42 of the short chain alkyl acrylate, and from about 8 to about 13% by weight of the acidic monomer.

The terpolymer can be prepared by the addition polymerization of the desired monomers. The addition polymerization is preferably accomplished by the use of a photoinitiator and electromagnetic radiation (e.g., UV, IR, microwave, etc.) in amounts sufficient to obtain a terpolymer of the desired molecular weight. Particular techniques of polymerization are disclosed in U.S. Pat. No. 4,181,752, the disclosure of which is incorporated herein by reference.

The adhesive composition also includes a crosslinking agent in an amount from about 0.7% to about 10% by weight of the terpolymer, preferably about 1% to about 8%. Amine formaldehyde condensates, e.g. lower-alkoxylated ($C_{1-4}$ alkyl groups) amine formaldehyde condensates are suitable crosslinking agents. An example of such a crosslinking agent is hexamethoxymethylmelamine, commercially available as CYMEL 303 from American Cyanamid (hereinafter Cymel 303). Further examples include tetramethoxy methyl urea, commercially available as BEETLE 65, or tetrabutoxy methyl urea, commercially available as BEETLE 85, both from American Cyanamid. The alkoxylated crosslinking agent is particularly effective in amounts within the range of about 1 to about 6% by weight of the terpolymer.

The amount of crosslinking agent is preferably selected to range from about 5% to about 15%, on an effective equivalent basis based on the number of equivalents of acid monomer available for crosslinking. For example, Cymel 303 is known to have a theoretical molecular weight of 390 grams per mole and an effective equivalency of 2.2 which leads to an effective equivalent weight of 177.3 grams per equivalent. This figure is then used to compute the amount of Cymel 303 needed to react with the available acidic monomer in the terpolymer. When the preferred terpolymers useful in this invention are employed the most preferred levels of Cymel 303 range from about 2% to about 5% by weight of the terpolymer. Lower levels of crosslinking agent may provide insufficient internal strength for some applications and higher levels of crosslinking agent reduce the initial tack of the adhesive and are insufficient in increasing the crosslink density of the crosslinked adhesive due to low diffusion rates in the crosslinking composition.

Other suitable crosslinking agents include chromophore-substituted halomethyltriazines, e.g. 4(3,4-dimethoxyphenyl)bistrichloromethyl-s-triazine. Because such triazines absorb UV light, the amount of the crosslinker used should be adjusted along with the amount of UV light and photoinitiator to obtain the desired degrees of polymerization and crosslinking of the terpolymer.

Mixtures of crosslinking agents, particularly Cymel 303 and the above-described triazine, are also within the contemplation of this invention. Indeed, a mixture of an amine formaldehyde condensate and a bistrihalomethyltriazine is the preferred crosslinking agent. While the triazine crosslinker component tends to crosslink during the UV polymerization of the acrylate terpolymer, it has been found that such crosslinking, unlike amine formaldehyde condensate crosslinking, does not detrimentally reduce the tack of the acrylate terpolymer. This is believed to be due to the more uniform distribution of triazine crosslinks (crosslinking by UV presumably occurs through the alpha hydrogen atoms of the acrylate molecule) which allows longer segments of uncrosslinked terpolymer to move freely and thereby provide tack.

Still other suitable crosslinking agents include the polyfunctional acrylate monomers, e.g, pentaerythritol tetra-acrylate, that can be copolymerized with the components of the terpolymer or graft polymerized onto a prepolymerized terpolymer. When the crosslinking agent used is a polyfunctional acrylate, the amount thereof should be kept to amounts less than about 3% by weight of the terpolymer, preferably less than 2% by weight. A polyfunctional acrylate monomer is any compound having two or more acrylate or metacrylate functionalities per molecule. Suitable polyfunctional acrylates are the acrylate esters of polyols. Specific polyfunctional acrylates include ethylene glycol diacrylate or dimethacrylate, glycerol triacrylate or trimethacrylate, trimethylol propane triacrylate or trimethacrylate, as well as the preferred pentaerythritol tetra-acrylate.

The adhesive of the present invention can be applied to a heat-recoverable closure in any manner that will ensure that the closure will remain closed during the recovery process. The preferred means of applying the adhesive to the closure involves the application of an adhesive tape of this invention to the closure. The adhesive can be deposited on a carrier backing and/or a release liner as a tape for application to the heat-recoverable substrate.

The adhesive tape of this invention can be manufactured via a procedure as taught in U.S. Pat. No. 4,181,752. In such a procedure, a mixture of the aforementioned monomers and an effective amount of a photoinitiator is partially polymerized by ultraviolet radiation to provide a syrupy composition having a coatable viscosity, e.g., from about 300 to 20,000 cps. The aforementioned crosslinking agent is added and the resulting mixture is coated on a release liner.

The adhesive is also preferably impregnated into a reinforcing web. The reinforcing web is impregnated with the adhesive by any means sufficient to substantially saturate the web with adhesive. The reinforcing web is preferably impregnated with the adhesive by the procedures disclosed in U.S. Pat. No. 4,181,752. The impregnated reinforcing web is preferably contacted by at least one release liner having a low adhesion surface and from which the reinforcing web can be applied to the heat-recoverable substrate. In a particularly preferred embodiment, the reinforcing web is impregnated with the partially polymerized monomer mixture and fed between two polyethylene terephthalate (PET) release liners (such as MYLAR film, available from DuPont, pretreated with a silicone release agent) which sandwich the impregnated web. The release liners are pressed against the web to ensure that little if any occluded air is present to inhibit the final polymerization. The entire sandwich structure is then exposed to ultraviolet radiation to complete the polymerization.

The adhesive is exposed to ultraviolet radiation in an inert environment to complete the copolymerization thereby providing a pressure-sensitive heat-activatable adhesive tape which can be immediately wound upon itself into a roll form for storage or shipment. Crosslinking of the amine formaldehyde condensate is easily avoided since very little heat is generated by the polymerization exotherm associated with this process. In addition to this preferred process, the monomer mixtures can be also polymerized with conventional peroxide-initiated solution polymerization techniques.

The reinforcing web is a porous flexible sheet material which is saturated with the adhesive and which maintains its structural integrity in at least one direction when subjected to the temperatures used to cause a heat-recoverable closure to recover, i.e. the direction of recovery. Examples of suitable reinforcing webs include fibrous webs of fiberglass and/or polyester. These webs may be non-woven or loosely woven, e.g. woven loosely enough to allow easy penetration of the nonpolymerized adhesive solution. Preferred webs are the woven fiberglass scrims and woven fabrics of fiberglass and polyester wherein all parallel threads are of the same fiber materials, i.e., the warp is fiberglass and the fill is polyester or vice versa.

The adhesive web can be applied to the closure sheet in a variety of ways to secure the sheet during the recovery thereof. For example, a portion of the adhesive-coated carrier backing can be placed, adhesive face down, upon a sheet transverse to the direction of recovery which has been wrapped a partial turn around the structure to be enclosed. The carrier backing is removed and the wrapping of the sheet is then continued such that the remainder of the sheet is allowed to completely overlap the adhesive. In this particular embodiment, the adhesive layer is interposed between layers of heat-recoverable material to maintain the closure, i.e., there is an interposed adhesive layer. A second layer of adhesive can be applied to the surface of the sheet which will contact and overlie the first adhesive after the wrapping is completed, but the use of such a second layer is not necessary.

Figure 2:
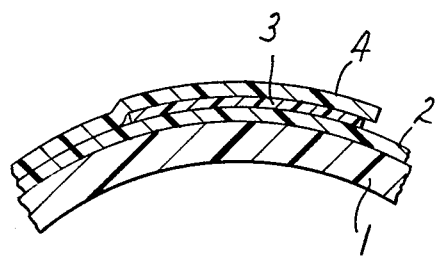
FIG. 2 is a cross-sectional view of an arc portion of a completed closure with an interposed adhesive layer.

FIG. 1 shows a substrate 1 about which a portion 2 of the sheet has been wrapped. An adhesive layer 3 has been placed upon the portion 2 of the sheet transverse to the direction of recovery such that completion of the wrapping will place the remaining portion 4 of the sheet over the adhesive layer 3. FIG. 2 shows a cross-section of the completed closure with portion 2 of the sheet underlying the adhesive layer 3 which in turn underlies portion 4 of the sheet, i.e., the adhesive layer 3 contacts the opposing faces of the two overlapped layers 2 and 4 of the sheet. The adhesive is then activated by the application of heat which also serves to cause the sheet to recover. Of course, that portion of the sheet overlying the adhesive should be heated first to activate the adhesive before the rest of the sheet is heated to produce substantial shear force at the closure of the sheet. When the adhesive does not contain a thermal crosslinking agent, e.g. Cymel 303, the heating of that portion of the sheet overlying the adhesive before the rest of the sheet is heated is still preferred. The heat will soften the pressure-sensitive adhesive to allow better melting of the sheet material and so enhance the adhesion thereof.

Figure 4:
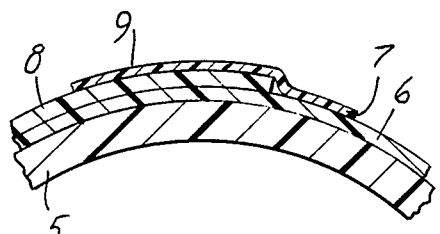
FIG. 4 is a cross-sectional view of an arc portion of a completed closure with an exterior adhesive layer.
Figure 3:
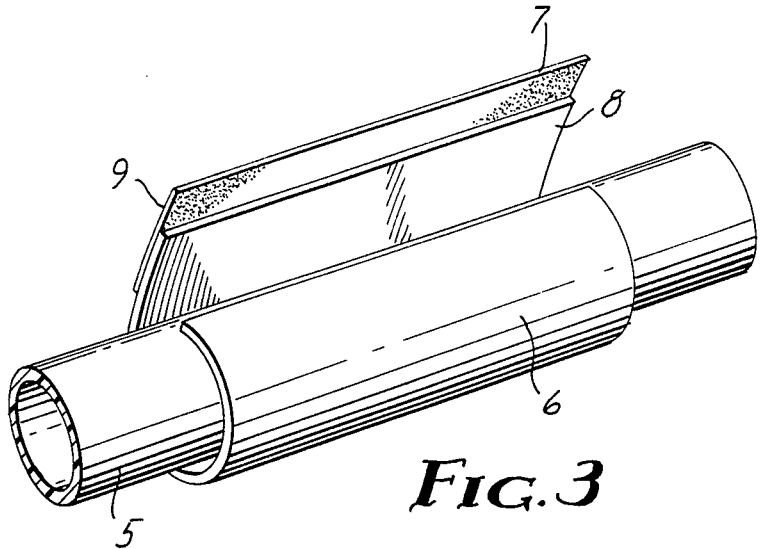
FIG. 3 is a view of a partially wrapped closure with an exterior adhesive layer.

Alternatively, the heat-recoverable sheet can be completely wrapped around the structure to be enclosed with the carrier tape applied to the longitudinal seam at the end of the circumferential wrap. In this embodiment, the adhesive layer is on the exterior of the closure, i.e. there is an exterior adhesive layer. FIG. 3 shows substrate 5 about which portion 6 of the sheet has been wrapped. An adhesive layer 7 extends from the edge of the remaining portion 8 of the sheet. FIG. 4 shows the adhesive layer 7 overlapping both portions 6 and 8 of the heat-recoverable sheet to maintain the closure thereof. When applied in this manner, the reverse face 9 of the adhesive layer 7, i.e. that face not in contact with the sheet, is preferably covered with a flame retardant backing, which will prevent exposure of the adhesive to the flame used to cause the sheet to recover. A flame retardant backing is any backing which will not propagate a flame when exposed to the heat necessary to cause the sheet to recover. Suitable flame retardant backings include synthetic fabrics such as KEVLAR from DuPont and coatings such as highly loaded carbon black in acetone acryloid. A particularly preferred flame retardant backing is woven cotton fabric pretreated with a flame retardant such as diammonium phosphate.

In accordance with the foregoing, the use of a terpolymer having higher than conventional acid functionality and the use of elevated levels of the alkoxylated condensate crosslinking agent and/or the use of a triazine crosslinking agent allow the formulation of a composition which is moderately tacky, thus allowing easy repositionability, but which is capable upon heating of crosslinking rapidly to a stiff composition which is non-flowable and provides substantial shear and peel resistance.

It has been found desirable to incorporate in the adhesive composition a reinforcing filler. Such fillers include chemically inert solids, generally particulate or fibrous solids. General examples include glass fibers, microfibers, mineral fibers, glass beads or bubbles, clay, metal oxides and the like. These may also be treated with a surface active agent, e.g. a vinylsilane, to enhance surface wetting of the filler by the adhesive thereby providing better reinforcement. A particulary preferred example of a reinforcing filler is CAB-O-SIL which is a fumed silica, commercially available from Cabot Corp. Levels of reinforcing filler range from about 2% to about 7% by weight preferably 3% to 6%. Amounts less than about 2% are often insufficient to reinforce the adhesive and amounts in excess of 7% may cause problems in processing due to the high content of non-liquid materials of the composition.

The filler is incorporated into the adhesive composition prior to polymerization to reinforce the adhesive when crosslinked, much like carbon black in rubber or elastomer compositions. When such a filler is incorporated, the thixotropic mixture obtained does not require the aforementioned prereaction to afford an increase in coating viscosity, and as a result is capable of wetting a reinforcing web more quickly and thoroughly.

It has been found that to achieve consistently superior bonding of the pressure-sensitive heat-activatable adhesive to low surface energy heat-recoverable sheet materials, e.g., polyolefins, during the recovery process, a primer must be utilized. A primer is not necessary for heat-recoverble sheet materials from polyesters or polyamides which have high surface energies.

The surface of the heat-recoverable closure to which the adhesive is to be applied is therefore preferably primed prior to the application of the adhesive of this invention. The priming of the sheet material can be accomplished by the procedures described in U.S. Ser. No. 583,896, filed Feb. 27, 1984, now U.S. Pat. No. 4,563,388, incorporated herein by reference. This priming of the closure is achieved by graft polymerizing to at least a portion of the closure at least one monomer selected from the group consisting of acrylic acid, methacrylic acid, and esters thereof; acrylamide, methacrylamide; sterically non-hindered tertiary alkyl acrylamides and methacrylamides; secondary alkyl acrylamides and methacrylamides having three or less carbon atoms in the alkyl group; and N-vinylpyrrolidone. The graft polymerization is preferably conducted by coating the desired portion of the substrate with a composition comprises of at least one of the above monomers and irradiating that coated portion with ionizing radiation, e.g., electron beam radiation. The preferred primer composition is comprised of a major amount of N,N-dimethylacrylamide, and minor amounts of an alkoxy methylolamino compound, e.g., CYMEL 303 available from American Cyanamid, a polyacrylate, e.g., trimethylolpropane triacrylate, an alkanol, e.g, n-butanol and trace amounts of a surfactant and an acid or mineral chain transfer agent, e.g., nitric acid or salts of silver, copper, etc.

Primer can be applied to the heat-recoverable sheet by utilizing, for example, a fine knurl gravure coater and irradiated as a thin, nearly invisible film by electron beam. The thinnest coating possible is most desirable to optimize product appearance and effectiveness of the primer, i.e., the amount of primer on the heat recoverable sheet is preferably minimized.

Heat-recoverable sheets used as wrap-around closure members are typically coated on their inner surface with a thermally activatable adhesive or mastic which is caused to flow into voids and irregularities on the attaching substrates surface by the shrinking tension of the sleeve during heat recovery. The heat activated mastic or sealant in effect acts to hermetically seal the cable once the sleeve is shrunk in place. The adhesive or mastic should melt and be flowable at a temperature below the shrink temperature of the sleeve to facilitate rapid shrinkage of the backing, be fluid in the 300°–350° F. range and yet possess high cohesive strength at 60° C. while under pressure. The adhesive or mastic should also adhere tenaciously to both lead and polyethylene and/or polyvinylchloride. While our closure can function with a wide range of sealants or mastics for various applications, a preferred heat activatable adhesive is based on a blend of an amine-terminated polyamide and an ethylene/acrylic acid copolymer.

EXAMPLES

The procedures used to prepare and test the following examples are described below.

Adhesive Preparation

In the following examples, all amounts are expressed in terms of parts by weight. A mixture of isooctyl acrylate (IOA), butyl acrylate (BA) and acrylic acid (AA), in the amounts shown in the tables, was placed in a glass jar and swirled gently to mix. To this was added 0.1 part by weight of 2-phenyl-2,2-dimethoxyacetophenone (Irgacure 651) photoinitiator and the indicated amounts of hexamethoxymethyl melamine (Cymel 303) and/or 4(3,4-dimethoxyphenyl)-bistrichloromethyl-s-triazine or pentaerylthritol tetra-acrylate (PETA) as crosslinker. After each of these additions the jar was swirled until the material was observed to be in solution. The indicated amount of fumed silica ("Cab-O-Sil" M5) was added incrementally with swirling to "wet out" each portion and the mixture was subsequently sheared until a solution of coatable viscosity was obtained.

The solution was next coated into a loosely woven fiberglass scrim to a thickness of 10 mils between 0.05 millimeter thick transparent biaxially-oriented films of polyethylene terephthalate, the facing surfaces of which had been previously treated with a release agent. Exposure to ultraviolet radiation which continued for 13 minutes beyond the observed exotherm substantially completely polymerized the fiberglass scrim-reinforced coating to a pressure-sensitive adhesive state. Alternatively, the solution was coated as described above, but without the inclusion of a fiberglass scrim.

Dynamic Shear

A strip of fiberglass scrim-reinforced tape was adhered by its adhesive layer to a primed polyethylene substrate by firm hand pressure applied through the end of a tongue depressor with a free end of tape extending beyond the substrate and the adhesive contact bond area being 1 inch by ½ inch. When the testing is to be done at an elevated temperature, this substrate was first adhered to stiff aluminum to impart rigidity while testing. An alternate method was to use the adhesive layer of a fiberglass scrim-reinforced tape to bond two freshly cleaned aluminum strips together with a bond area of 1 inch by ½ inch. The bond was tested in shear in an Instron tensile tester at a jaw separation rate of about 1 millimeter per second.

Rheological Properties (ODR)

Pairs of adhesive discs, each disc 1 ¼ inch in diameter and ⅛ inch in thickness, were prepared by repeatedly layering sheets of polymerized adhesive which contains no fiberglass using firm hand pressure applied through the end of a tongue depressor until the required thickness was obtained or by using ultraviolet radiation to cure unpolymerized adhesive solution which had been poured into appropriately sized wells and covered with a release agent treated transparent biaxially-oriented film of polyethylene terephthalate for 13 minutes beyond the observed exotherm. One of each pair of adhesive discs had a ⅜ inch diameter hole punched in its center which accomodates the shaft of the metal disc in a Monsanto Oscillating Disc Rheometer (ODR). The other adhesive disc was placed on top of the ODR disc. The chamber, which had been previously heated to a temperature sufficient to crosslink the adhesive, was closed and the metal disc was started oscillating through an arc of 3 degrees. The test was continued until the generated graph indicated that a peak had occurred or until it became obvious that no peak was likely to occur.

Peel Adhesion Value

A strip of fiberglass scrim-reinforced tape was adhered to either a primed polyethylene substrate or a freshly cleaned aluminum substrate using firm hand pressure applied through the end of a tongue depressor and leaving a long end free. When testing was to be done at an elevated temperature from primed polyethylene, this substrate was first adhered to stiff aluminum to impart rigidity while testing. The free end of the tape was grasped by the jaws of an Instron tensile tester while the substrate was restrained in an apparatus which ensures a peelback of 90 degrees. The tape was pulled from the substrate at a rate of about 1 millimeter per second.

Swell Measurement Value

A 1 inch diameter disc weighing about 0.3 g was cut from a sheet of polymerized adhesive which contains no fiberglass or other reinforcing scrim. The adhesive was optionally aged in an oven at 150° F. for the number of days shown in each table and/or optionally cured at 350° F. for 4 min. prior to testing, as shown in the tables. The disc was accurately weighed and then placed in a 4 oz. jar containing 30 g of methyl ethyl ketone (MEK) and allowed to swell at room temperature for 24 hours. The disc was then removed from the MEK and accurately weighed. The amount of MEK absorbed by the adhesive disc sample was calculated using the following equation:

$$\text{Swelling Index } (Q) = \frac{\text{Swollen adhesive disc weight}}{\text{Initial adhesive disc weight}} - 1$$

Sleeve Test

Closure strips were prepared for application testing by laminating a suitably flame retardant cotton cloth (boot duck 2818/40 available from Burcott Mills, Chicago, Ill., saturated with a solution of diammonium phosphate and dried) to one side of each of the fiberglass scrim-reinforced tapes (examples 1–15) and then trimming them into strips 1.5 inches wide and 12 inches long. Sleeves were prepared from graft-primed (primed in accordance with Example 27 of U.S. application Ser. No. 583,896, filed Feb. 27, 1984, now U.S. Pat. No. 4,563,388) polyethylene heat-recoverable sheet material having the characteristics shown below:

Backing characteristics:
Extruded Caliper=0.100 inches
Stretched Caliper=0.028 inches
Recovered Caliper=0.097 inches
Shrink ratio=3.8
Shrink force=9.6 pli
M-100=51.8 psi
% gel=98%

The sheet material had a 20 mil layer of extruded hot melt on the reverse side. The sheet was trimmed to 12 inches in the "cable length" direction and 9 inches in the "circumferential" or "recovery" direction to form a sleeve. The tape was then ½ lapped to one edge of the sleeve, the sleeve was wrapped circumferentially around a 1.9 inch diameter cable and overlayed an inch before mating the remaining ½ lap of exposed tape to the backing surface thus creating a closed and overlapped sleeve of 2.6 inches in diameter. The closure strip was rubbed firmly with a tongue depressor to ensure uniform contact to the backing surface.

A MAPP (stabilized methylacetylenepropadiene available from Airco, Inc., Murray Hill, N.J.) gas torch with a bushy flame was used to shrink the sleeve down on to the cable. The heat was applied to the area of the closure strip first to activate the adhesive and then to the sleeve backing. The geometry chosen allowed the sleeves to recover about 25%, leaving a residual recovery force of about 5.4 pli which the closure strips must hold. The sleeves were heated for about 3-5 minutes to ensure activation of the hot melt and it is at this point that the viscosity thins sufficiently to transfer substantially all of the recovery force substantially to the closure strip. If the tape closure held this force it passed the test (H=hold), if it opened up it failed (R=release). It should be noted that an R rating, e.g., a release, may be due to primer and/or sheet failure as well as adhesive failure such that an R rating does not necessarily denote failure of the adhesive of this invention.

EXAMPLES 1-15

The results of Examples 1-15 are shown in Table I, below.

TABLE I

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| IOA | 52 | 55 | 52 | 53 | 55 | 52 | 52 | 55 | 55 | 55 | 55 | 55 | 55 | 55 | 55 |
| BA | 32 | 35 | 32 | 34 | 35 | 32 | 32 | 35 | 35 | 35 | 35 | 35 | 35 | 35 | 35 |
| AA | 16 | 10 | 16 | 13 | 10 | 16 | 16 | 10 | 10 | 10 | 10 | 10 | 10 | 10 | 10 |
| Cymel 303 | 3.5 | 2.2 | 2.36 | 2.4 | 1.48 | 2.36 | 3.5 | 2.2 | 1.48 | 2.2 | — | — | — | — | 0.5 |
| Cab-O-Sil M5 | 6 | 6 | 6 | 5 | 6 | 4 | 4 | 4 | 4 | 4 | 6 | 4 | 4 | 4 | 4 |
| XL-353 | — | — | — | — | — | — | — | — | — | — | — | 0.1 | 0.15 | 0.20 | 0.1 |
| Aged Time (Days) | | | | | | | Swelling Index (Q): | | | | | | | | |
| 0 | 19.1 | 17.8 | 17.9 | 22.5 | 14.3 | 20.9 | 17.9 | — | — | — | — | 13.06 | 15.52 | 15.30 | 8.04 |
| 1 | 3.73 | 4.79 | 4.2 | 4.43 | 5.54 | 4.03 | 4.07 | 7.12 | 8.21 | — | — | — | — | — | — |
| 3 | 2.54 | 3.54 | 3.12 | 3.47 | 4.33 | 3.39 | 2.97 | 4.27 | 4.97 | — | — | — | — | — | — |
| 5 | 2.36 | 2.92 | 2.89 | 3.11 | 3.86 | 3.03 | 2.64 | 3.68 | 4.36 | — | — | — | — | — | — |
| 10 | 1.90 | 2.5 | 2.48 | 2.54 | 3.03 | 2.74 | 2.21 | 3.16 | 3.67 | — | — | — | — | — | — |
| Cured at 350° F., 4 minutes | 2.23 | 3.33 | 2.91 | 3.56 | 5.93 | 4.97 | 3.39 | 8.89 | 9.21 | 4.18 | — | — | — | — | 6.16 |
| Sleeve Test | R | R | H | R | H | H | R | H | R | H | R | H | — | — | H |

EXAMPLES 16-19

The dynamic shear, rheological properties and peel adhesion values were measured for a terpolymer of IOA/BA/AA:52%/32%/16%, respectively, with varying amounts of Cymel 303 crosslinker and Cab-O-Sil reinforcing filler to show the effect of these components. Examples A and B without a crosslinker are shown for comparsion.

TABLE II

| Example | Cymel 303 (wt %) | Cab-O-Sil (wt %) | ODR (in.-lb.) | Shear 23° C. | Shear 180° C. | Peel 23° C. | Peel 180° C. |
|---|---|---|---|---|---|---|---|
| 16 | 2.5 | — | 16.8 | — | — | — | — |
| 17 | 3.5 | — | 20.4 | 120 | 22 | 4 | 1.5 |
| 18 | 3.5 | 6 | 30.0 | — | — | — | — |
| 19 | 5.0 | — | 24.2 | — | — | — | — |
| A | — | — | 4.0 | — | — | — | — |
| B | — | 6 | 6.6 | — | — | — | — |

EXAMPLES 20-25

The rheological properties at 180° C. of a fully cured terpolymer of IOA/BA/AA:53%/36%/11% cured with varying levels of CYMEL 303 are shown in Table III. The results show that the effect of additional cross-linking agent is linear up to about ⅓ equivalent but falls off asymptotically at levels above ⅓ equivalent.

TABLE III

| | CYMEL 303 | | ODR |
|---|---|---|---|
| Example | (wt %) | (Equiv. Fraction) | (in-lb) |
| 20 | 13.5 | ½ | 32.9 |
| 21 | 6.8 | ¼ | 27.5 |
| 22 | 3.4 | ⅛ | 21.2 |
| 23 | 1.7 | 1/16 | 12.1 |
| 24 | 0.8 | 1/32 | 8.1 |
| 25 | 0.4 | 1/64 | 6.0 |

EXAMPLES 26-31

The swelling measurement (Q) and sleeve test evaluation of a fully cured terpolymer (prepared with and without a reinforcing fiberglass scrim) of IOA/BA/AA: 55/35/10 parts by weight 4 parts by weight Cab-O-Sil, 0.1 parts by weight Irgacure 650, prepared as described above and using as a crosslinker varying parts of PETA per 100 parts PSA as indicated are shown in Table IV.

The sleeve test was conducted with a sheet material which has a shrinkage force of 4.8 pounds per inch when it shrinks from 2.59 inch in diameter to a cable of 1.35 inch in diameter.

TABLE IV

| Example No. | PETA (parts per 100 parts PSA) | Swelling Index | Test on sleeve |
|---|---|---|---|
| 26 | 0.1 | 8.07 | H |
| 27 | 0.2 | 6.00 | H |
| 28 | 0.4 | 5.08 | H |
| 29 | 1 | 3.17 | H |
| 30 | 3 | 1.71 | R |
| 31 | 5 | 1.26 | R |

Tapes with three or more parts of PETA crosslinker per φ parts PSA show a release (R) rating on the sleeve test.

EXAMPLES 32–37

Aging Study

Swelling measurements were carried out on tape samples corresponding to the sample of Example 27 and the results are reported in the Table V.

TABLE V

| Example | Aged (Days) | Swelling Index, Q |
|---------|-------------|-------------------|
| 32 | 2 | 5.66 |
| 33 | 5 | 6.17 |
| 34 | 13 | 4.90 |
| 35 | 20 | 5.60 |
| 36 | 35 | 5.69 |

The tapes crosslinked by PETA showed very little change in swelling index, while tapes which contained Cymel as a crosslinker, e.g, Examples 1–10, showed a significant decrease in swelling index.

What is claimed is:

1. An article useful as a wrap-around protective closure comprising:
   (a) a sheet of flexible heat-recoverable material with a low surface-energy, having a unidirectional direction or recovery;
   (b) a layer of an effective amount of a crosslinked pressure-sensitive adhesive having an exposed face and a face in contact with said sheet, adhered to at least a portion of said sheet transverse to said direction of recovery of said sheet; and
   (c) a primer graft-polymerized to at least a portion of said sheet of heat-recoverable material.

2. An article according to claim 1 wherein the primer comprises at least one monomer selected from the group consisting of acrylic acid, methacrylic acid and esters thereof, acrylamides, methacrylamide, sterically nonhindered tertiary alkyl acrylamides and methacrylamides having three or less carbon atoms in the alkyl group and N-vinyl pyrrolidone.

3. An article according to claim 2 where in the primer comprises N,N-dimethylacrylamide.

4. An article according to claim 1 further comprising a release liner having a face contacting said sheet or said adhesive.

5. An article in accordance with claim 1 where wherein the crosslinked pressure-sensitive adhesive is comprised of:
   (a) an acrylate terpolymer comprised of:
      (i) at least one alkyl acrylate wherein the alkyl group has at least 5 carbon atoms,
      (ii) a second alkyl acrylate wherein the alkyl group has from 1 to 4 carbon atoms;
      (iii) at least one copolymerizable monoethylenic monomer selected from the group consisting of acrylic acid, methacrylic acid, and itaconic acid; and
   (b) a crosslinking agent selected from the group consisting of
      (i) an amine formaldehyde condensate,
      (ii) a chromophore-substituted trihalomethyltriazine,
      (iii) a polyfunctional acrylate monomer, and
      (iv) mixtures thereof 6. An article in accordance with claim 5 wherein the crosslinking agent is a lower alkoxylated amine formaldehyde condensate.

7. An article in accordance with claim 5 wherein the crosslinking agent is a chromophore-substituted trihalomethyltriazine.

8. An article in accordance with claim 5 wherein the crosslinking agent is 4(3,4-dimethoxyphenyl)-bistrichloromethyl-s-triazine.

9. An article in accordance with claim 6 wherein the crosslinking agent is a mixture of an amine formaldehyde condensate and a chromophore-substituted trihalomethyltriazine.

10. An article in accordance with claim 5 wherein the crosslinking agent is a polyfunctional acrylate monomer.

11. An article in accordance with claim 1 further comprising a reinforcing filler.

12. An article in accordance with claim 11 wherein the reinforcing filler is fumed silica.

13. An article in accordance with claim 12 wherein the fumed silica is present at a concentration of about 2% to about 7% by weight of the adhesive.

14. An article in accordance with claim 13 wherein the fumed silica is present at a concentration of about 3% to about 6% by weight of the adhesive.

15. An article in accordance with claim 1 wherein the sheet material is a blend of a non-crystalline polymer and a semicrystalline polymer.

16. An article in accordance with claim 1 wherein the sheet material is a polyolefin.

17. An article in accordance with claim 16 wherein the sheet material is polyethylene.

* * * * *